United States Patent
Zhao et al.

(10) Patent No.: US 10,625,845 B2
(45) Date of Patent: Apr. 21, 2020

(54) LOCK MECHANISM, PROPELLER HAVING A LOCK MECHANISM, AND AERIAL VEHICLE

(71) Applicant: SZ DJI TECHNOLOGY CO., LTD., Shenzhen (CN)

(72) Inventors: Xifeng Zhao, Shenzhen (CN); Weidong Li, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 253 days.

(21) Appl. No.: 15/585,543

(22) Filed: May 3, 2017

(65) Prior Publication Data

US 2017/0233063 A1 Aug. 17, 2017

Related U.S. Application Data

(63) Continuation of application No. PCT/CN2014/090276, filed on Nov. 4, 2014.

(51) Int. Cl.
| | |
|---|---|
| B64C 11/02 | (2006.01) |
| F16B 2/16 | (2006.01) |
| B64C 11/00 | (2006.01) |
| F16D 1/06 | (2006.01) |
| F16B 21/12 | (2006.01) |
| F16B 21/16 | (2006.01) |

(Continued)

(52) U.S. Cl.
CPC .............. *B64C 11/02* (2013.01); *B64C 11/00* (2013.01); *F16B 21/12* (2013.01); *F16B 21/165* (2013.01); *F16D 1/06* (2013.01); *B64C 2201/108* (2013.01); *B64C 2201/165* (2013.01); *F16B 21/10* (2013.01); *F16B 21/16* (2013.01); *F16D 1/116* (2013.01)

(58) Field of Classification Search
CPC .... Y10T 403/592; Y10T 403/599; F16B 2/16; F16B 21/165; B64C 11/00; B64C 11/02
See application file for complete search history.

(56) References Cited

U.S. PATENT DOCUMENTS

| | | | | |
|---|---|---|---|---|
| 4,440,122 A | * | 4/1984 | Theobald | F02B 9/06 123/185.14 |
| 4,988,248 A | * | 1/1991 | Flux | F16B 21/16 280/507 |

(Continued)

FOREIGN PATENT DOCUMENTS

| | | |
|---|---|---|
| CN | 201575888 U | 9/2010 |
| CN | 101859970 A | 10/2010 |

(Continued)

OTHER PUBLICATIONS

The World Intellectual Property Organization (WIPO) International Search Report for PCT/CN2014/090276 dated May 6, 2015 6 Pages.

*Primary Examiner* — Michael P Ferguson
(74) *Attorney, Agent, or Firm* — Anova Law Group, PLLC

(57) ABSTRACT

A lock mechanism includes a snapping part and a pressing part configured to be slidably connected with a first body. The pressing part includes a pressing end and an abutting end opposite to the pressing end. The abutting end is configured to abut against the snapping part to make the snapping part engage with a second body and to lock the second body onto the first body.

16 Claims, 6 Drawing Sheets

(51) Int. Cl.
*F16D 1/116* (2006.01)
*F16B 21/10* (2006.01)

(56) References Cited

U.S. PATENT DOCUMENTS

| | | | | |
|---|---|---|---|---|
| 5,494,323 | A * | 2/1996 | Huang | F16B 21/165 24/453 |
| 6,077,011 | A * | 6/2000 | Walker | F16B 21/165 24/453 |
| 6,299,106 | B1 * | 10/2001 | Shorey | B64G 1/58 244/171.7 |
| 6,799,919 | B2 * | 10/2004 | Reynertson, Jr. | B25B 23/0035 279/2.12 |
| 8,430,709 | B1 * | 4/2013 | Wong | A63H 27/02 446/34 |
| 8,960,734 | B2 * | 2/2015 | Camp | E05B 1/0038 292/193 |
| 2012/0177497 | A1 * | 7/2012 | Huang | A63H 27/02 416/204 R |
| 2013/0136532 | A1 * | 5/2013 | Liao | F16B 2/16 403/327 |

FOREIGN PATENT DOCUMENTS

| | | |
|---|---|---|
| CN | 202185744 U | 4/2012 |
| CN | 103065824 A | 4/2013 |
| CN | 104037540 A | 9/2014 |
| CN | 204210728 U | 3/2015 |
| GB | 202200 A | 8/1923 |
| JP | S55115626 A | 9/1980 |
| JP | S59164809 U | 11/1984 |
| JP | S6256622 A | 3/1987 |
| JP | H06281525 A | 10/1994 |
| JP | H09310722 A | 12/1997 |
| JP | 2000230567 A | 8/2000 |
| JP | 2001018895 A | 1/2001 |
| WO | WO 2013/066477 * 5/2013 | ............. B64C 11/04 |

* cited by examiner

LOCK MECHANISM, PROPELLER HAVING A LOCK MECHANISM, AND AERIAL VEHICLE

CROSS-REFERENCE TO RELATED APPLICATION

This is a continuation application of International Application No. PCT/CN2014/090276, filed on Nov. 4, 2014, the entire contents of which are incorporated herein by reference.

TECHNICAL FIELD

The present disclosure relates to a propeller, and in particular, to a lock mechanism of a propeller.

BACKGROUND OF THE DISCLOSURE

A propeller is generally used as a propulsor for aerial vehicles, ships, or other devices. The propeller generally includes a blade set and a base. The blade set is mounted on the base, and at the same time, a driving shaft is connected with the base. The driving shaft rotates under the action of a motor to drive the blade set to rotate together. At present, the base and the driving shaft are fixedly connected with each other generally through close-fit threading or by punching screw holes on the base and the driving shaft and then using screws to fixedly mount the base onto the driving shaft.

When the base and a rotary shaft are fixed through the aforementioned close-fit threading, a tightening direction of the base is the same as a rotation direction of the blade set in the working process, and the blade set is in a good connection with the rotary shaft during startup and normal operation. However, in an event that the blade set suddenly slows down or the acceleration varies significantly, under the accelerations, the base and the driving shaft, are likely to loosen up. In addition, in an event of a vibration in a large amplitude, the base and the driving shaft are likely to loosen up, causing a propeller runaway. However, the base and the driving shaft fixed by the screwing manner above are not easy to be removed.

SUMMARY OF THE DISCLOSURE

In view of this, the present disclosure provides a propeller that is easy to remove and has a lock mechanism, an aerial vehicle having the propeller and a lock mechanism.

In accordance with the disclosure, there is provided a lock mechanism including a snapping part and a pressing part configured to be slidably connected with a first body. The pressing part includes a pressing end and an abutting end opposite to the pressing end. The abutting end is configured to abut against the snapping part to make the snapping part engage with a second body and to lock the second body onto the first body.

In some embodiments, the snapping part is configured to fit in a slot disposed on a free end of a snapping arm on the second body and engage with the slot, to make the second body locked onto the first body.

In some embodiments, the pressing part is configured to separate from the snapping part when the pressing part slides to a pre-set position relative to the first body, causing the snapping part to detach from the second body to allow the second body to separate from the first body.

In some embodiments, the lock part further includes an elastic member configured to abut between the pressing part and the first body, and the snapping part is configured to engage with the second body when the elastic member is in a natural state.

In some embodiments, the lock mechanism further includes a mounting base configured to be connected with the first body. The mounting base includes a bush part having a receiving hole configured to partially receive the second body. A side wall of the bush part includes a through hole accommodating the snapping part. The pressing part includes art accommodating hole disposed on the abutting end. An inner side wall of the accommodating hole includes a recess. When the snapping part engages with the second body, one end of the snapping part is snapped to the second body and another end of the snapping part abuts against the inner side wall of the accommodating hole. When the pressing part slides to a pre-set position relative to the first body, the recess is communicated with the through hole, and the snapping part is separated from the inner side wall of the accommodating hole, causing the snapping part to detach from the second body.

In some embodiments, the mounting base includes a mounting hole configured to connect with the second body, the mounting hole being in communication with the receiving hole.

In some embodiments, the lock part further includes a pin and the pressing part comprises a sliding slot. One end of the pin is configured to connect with the first body and another end of the pin is slidably received in the sliding slot. The pin is configured to slide in the sliding slot and limit movement of the pressing part relative to the first body.

Also in accordance with the disclosure, there is provided a propeller including a blade set and a lock mechanism. The lock mechanism includes a snapping part and a pressing part configured to be slidably connected with the blade set. The pressing part includes a pressing end and an abutting end opposite to the pressing end. The abutting end is configured to abut against the snapping part to make the snapping part engage with a driving shaft and to lock the driving shaft onto the blade set.

In some embodiments, the snapping part is configured to fit in a slot disposed on a free end of a snapping arm on the driving shaft and engage with the slot, to make the driving shaft locked onto the propeller.

In some embodiments, the abutting end of the pressing part is configured to separate from the snapping part when the pressing part slides to a pre-set position relative to the blade set, causing the snapping part to detach from the driving to allow the driving shaft to separate from the blade set.

In some embodiments, the propeller further includes a mounting base configured to be connected with the blade set. The mounting base includes a bush pan having a receiving hole configured to partially receive the snapping arm. A side wall of the bush part includes a through hole accommodating the snapping part. The pressing part includes an accommodating hole disposed on the abutting end. An inner side wall of the accommodating hole includes a recess. When the snapping part engages with the driving shaft, one end of the snapping part is snapped to the driving shaft and another end of the snapping part abuts against the inner side wall of the accommodating hole. When the pressing part slides to a pre-set position relative to the blade set, the recess is communicated with the through hole, and the snapping part is separated from the inner side wall of the accommodating hole, causing the snapping part to detach from the driving shaft.

In some embodiments, the lock part further includes an elastic member configured to abut between the pressing part and the blade set, and the snapping part is configured to engage with the driving shaft when the elastic member is in a natural state.

In some embodiments, the mounting base includes a mounting hole configured to connect with the driving shaft. The mounting hole is in communication with the receiving hole.

In some embodiments, the through hole is a first through hole and the blade set includes a second through hole. The mounting base is fixed in the second through hole, and the pressing part is slidably disposed in the second through hole.

In some embodiments, the lock part further includes a pin and the pressing part includes a sliding slot. One end of the pin is connected with the blade set and another end of the pin is slidably received in the sliding slot. The pin is configured to slide in the sliding slot and limit movement of the pressing part relative to the blade set.

Also in accordance with the disclosure, there is provided an aerial vehicle including an aerial vehicle body, a motor disposed on the aerial vehicle body and including a driving shaft, and a propeller connected with the driving shaft. The propeller includes a blade set and a lock mechanism. The lock mechanism includes a snapping part and a pressing part configured to be slidably connected with the blade set. The pressing part includes a pressing end and an abutting end opposite to the pressing end. The abutting end is configured to abut against the snapping part to make the snapping part engage with the driving shaft and to lock the driving shaft onto the blade set.

In some embodiments, the snapping part is configured to fit in a slot disposed on a free end of a snapping arm on the driving shaft and engage with the slot, to make the driving shaft locked onto the propeller.

In some embodiments, the abutting end of the pressing part is configured to separate from the snapping part when the pressing part slides to a pre-set position relative to the blade set, causing the snapping part to detach from the driving to allow the driving shaft to separate from the blade set.

In some embodiments, the slot includes a recess formed through depression from an outer side surface of the free end of the snapping arm.

In some embodiments, the lock mechanism further includes a mounting base configured to be connected with the blade set. The mounting base includes a bush part having a receiving hole configured to partially receive the snapping arm. A side wall of the bush part includes a through hole accommodating the snapping part. The pressing part includes an accommodating hole disposed on the abutting end. An inner side wall of the accommodating hole includes a recess. When the snapping part engages with the driving shaft, one end of the snapping part is snapped to the driving shaft and another end of the snapping part abuts against the inner side wall of the accommodating hole. When the pressing part slides to a pre-set position relative to the blade set, the recess is communicated with the through hole, and the snapping part is separated from the inner side wall of the accommodating hole, causing the snapping part to detach from the driving shaft.

In some embodiments, the mounting base includes a mounting hole configured to connect with the driving shaft. The mounting hole is in communication with the receiving hole provided inside the bush part and configured to receive the snapping arm.

In some embodiments, the through hole is a first through hole and the blade set includes a second through hole. The mounting base is fixed in the second through hole, and the pressing part is slidably disposed in the second through hole.

In some embodiments, the lock part further includes a pin. The pressing part includes a sliding slot. One end of the pin is connected with the blade set and another end of the pin is slidably received in the sliding slot. The pin is configured to slide in the sliding slot and limit movement of the pressing part relative to the blade set.

According to the propeller that uses the lock device of the present disclosure, even if the propeller vibrates in a large amplitude or the acceleration varies significantly, the propeller and the driving shaft will not loosen up, and the propeller that uses the lock device has a structure allowing simple disassembly and having parts that are easy to replace.

DESCRIPTION OF REFERENCE NUMERALS OF MAIN ELEMENTS

TABLE 1

| | |
|---|---|
| Propeller | 100 |
| Driving shaft | 10 |
| First end portion | 11 |
| External thread | 111 |
| Second end portion | 12 |
| Snapping arm | 13 |
| Slot | 14 |
| Blade set | 20 |
| Hub | 21 |
| Blade | 22 |
| First through hole | 23 |
| First opening | 231 |
| Second opening | 232 |
| Mounting base | 30 |
| Third end portion | 31 |
| First recess | 310 |
| Fourth end portion | 32 |
| Mounting hole | 33 |
| Internal thread | 331 |
| First accommodating hole | 34 |
| Hole | 35 |
| Bush part | 36 |
| Bottom surface | 37 |
| Second through hole | 38 |
| Third through hole | 39 |
| Lock part | 40 |
| Pressing part | 41 |
| Pressing end | 411 |
| Abutting end | 412 |
| First blocking portion | 413 |

TABLE 1-continued

| | |
|---|---|
| Second accommodating hole | 414 |
| Second recess | 415 |
| Sliding slot | 416 |
| Inner side wall | 417 |
| Snapping part | 42 |
| Elastic member | 43 |
| Pin | 44 |

Exemplary embodiments will be described below in connection with the above-mentioned drawings.

DETAILED DESCRIPTION OF THE EMBODIMENTS

Figure 1:
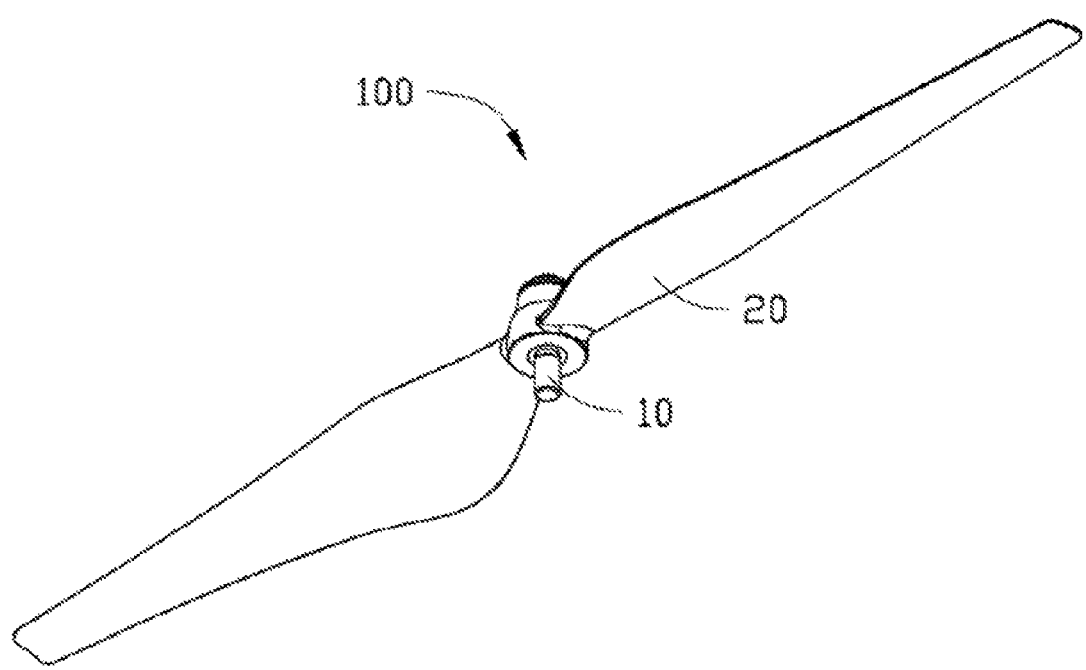
FIG. 1 is a schematic structural diagram of a propeller according to an implementation mode of the present disclosure.

Referring to FIG. 1, it is a schematic structural diagram of a propeller 100 according to an implementation mode of the present disclosure. The propeller 100 includes a blade set 20. The blade set 20 is connected with a driving shaft 10. The driving shaft 10 is further connected with an electric motor (not shown), and the electric motor drives the driving shaft 10 to rotate, thus driving the blade set 20 to rotate. The propeller 100 can be used in unmanned aerial vehicles, remote control aircrafts, and other aerial vehicles.

Figure 2:
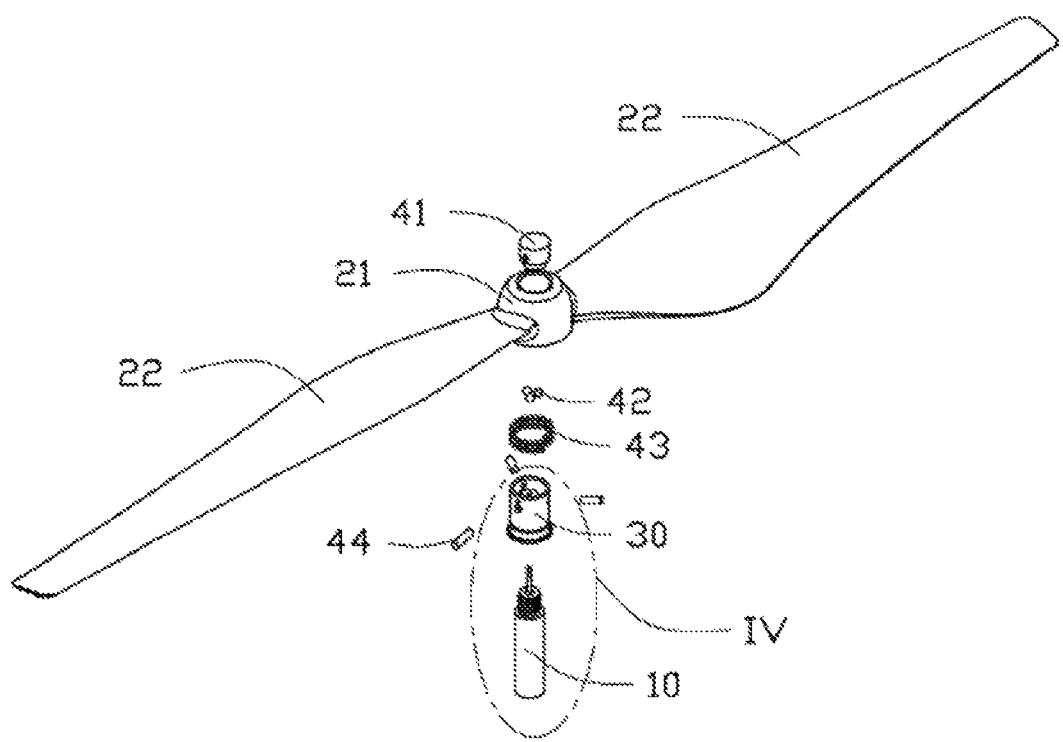
FIG. 2 is an exploded schematic structural diagram of the propeller in FIG. 1.
Figure 3:
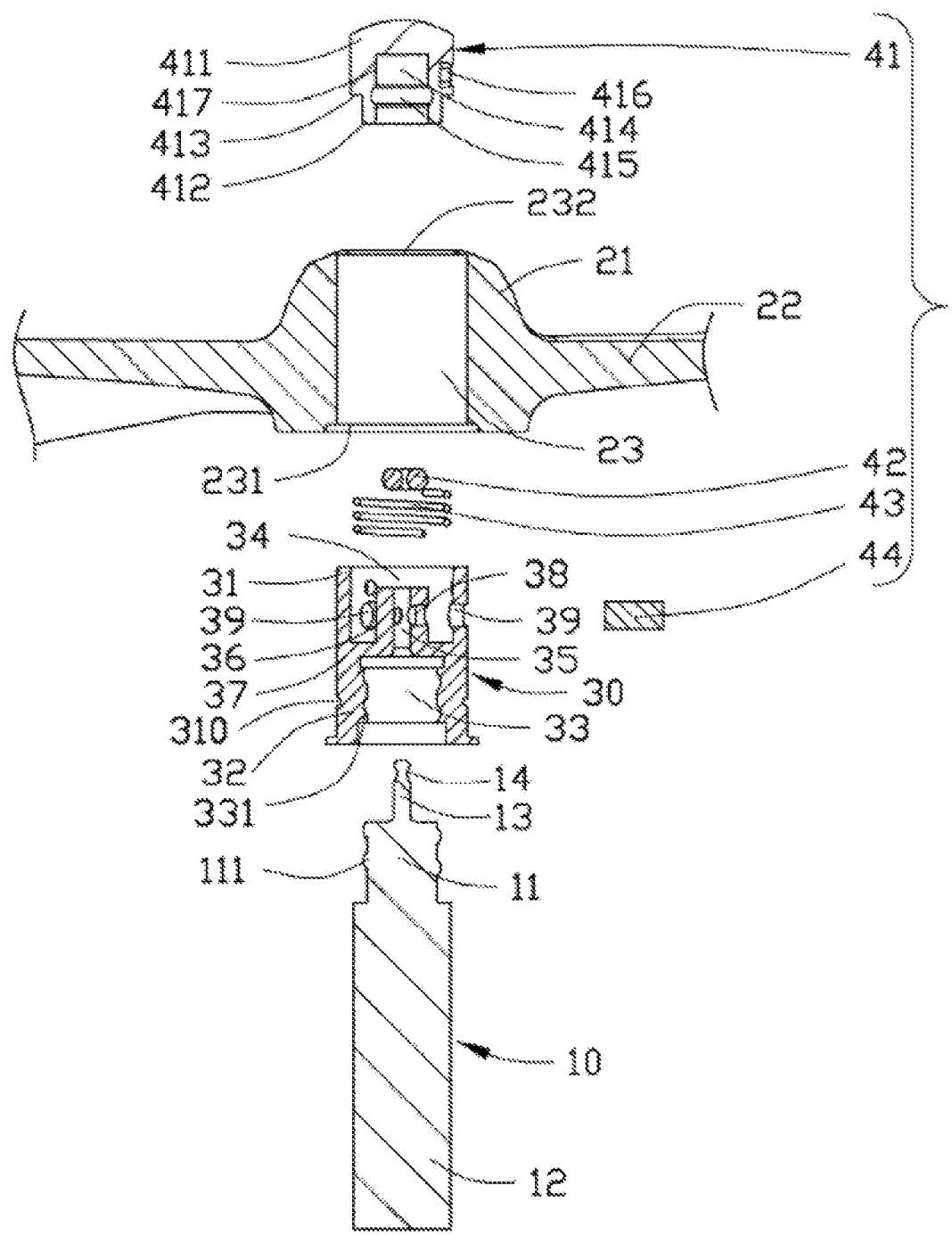
FIG. 3 is a schematic sectional diagram of the propeller in FIG. 2 along III-III.

Referring to FIG. 2 and FIG. 3 together, the propeller 100 further includes a mounting base 30, and a lock part 40. The lock part 40 includes a pressing part 41 and a snapping part 42. In the implementation mode, the lock part 40 further includes an elastic member 43.

The blade set 20 includes a hub 21 and a blade 22, and the hub 21 is provided thereon with a first through hole 23. The first through hole 23 includes a first opening 231 and a second opening 232 disposed opposite to each other.

In the implementation mode, the hub 21 and the blade 22 of the blade set 20 are integrally injection-molded. An outer side wall of the mounting base 30 is recessed inwardly to form a first recess 310. During injection molding of the blade set 20, at first, the mounting base 30 is placed at a corresponding position in a cavity of a mold. Then, molten plastic is injected. The molten plastic can be filled into the first recess 310 in the process of injection molding. After demolding, the mounting base 30 is directly fixed into the hub 21 of the blade set 20. The first recess 310 is used for increasing the binding force between the mounting base 30 and the hub 21, and the first recess 310 may be an annular slot or a plurality of concave holes formed through inward depression from the outer side wall of the mounting base 30. In another implementation mode, it is also feasible to dispose a protruding part on the outer side wall of the mounting base 30 to increase the binding force between the mounting base 30 and the hub 21 by wrapping the protruding part with plastic in the injection molding.

In other implementation modes, the mounting base 30 is inserted into the first through hole 23 from the first opening 231, and is fixedly connected with the hub 21. The mounting base 30 may be connected with the hub 21 through adhesion, interference fit, snapping, or the like. As the mounting base 30 is fixedly connected with the hub 21, when the electric motor drives the driving shaft 10 to rotate, the mounting base 30 drives the blade 22 of the blade set 20 to rotate.

In one implementation mode, the diameter of the first opening 231 of the first through hole 23 is less than the maximum diameter of the mounting base 30, and the mounting base 30 will not fall out from the first opening 231 of the first through hole 23. The diameter of the second opening 232 of the first through hole 23 is greater than the maximum diameter of the mounting base 30, and the mounting base 30 can be loaded into the first through hole 23 from the second opening 232. The huh 21 may also be manufactured with an elastic material. The second opening 232 of the first through hole 23 may be equal to or slightly less than the maximum diameter of the mounting base 30, and by elastic deformation of the elastic material, the mounting base 30 can be loaded into the first through hole 23 from the second opening 232.

Figure 4:
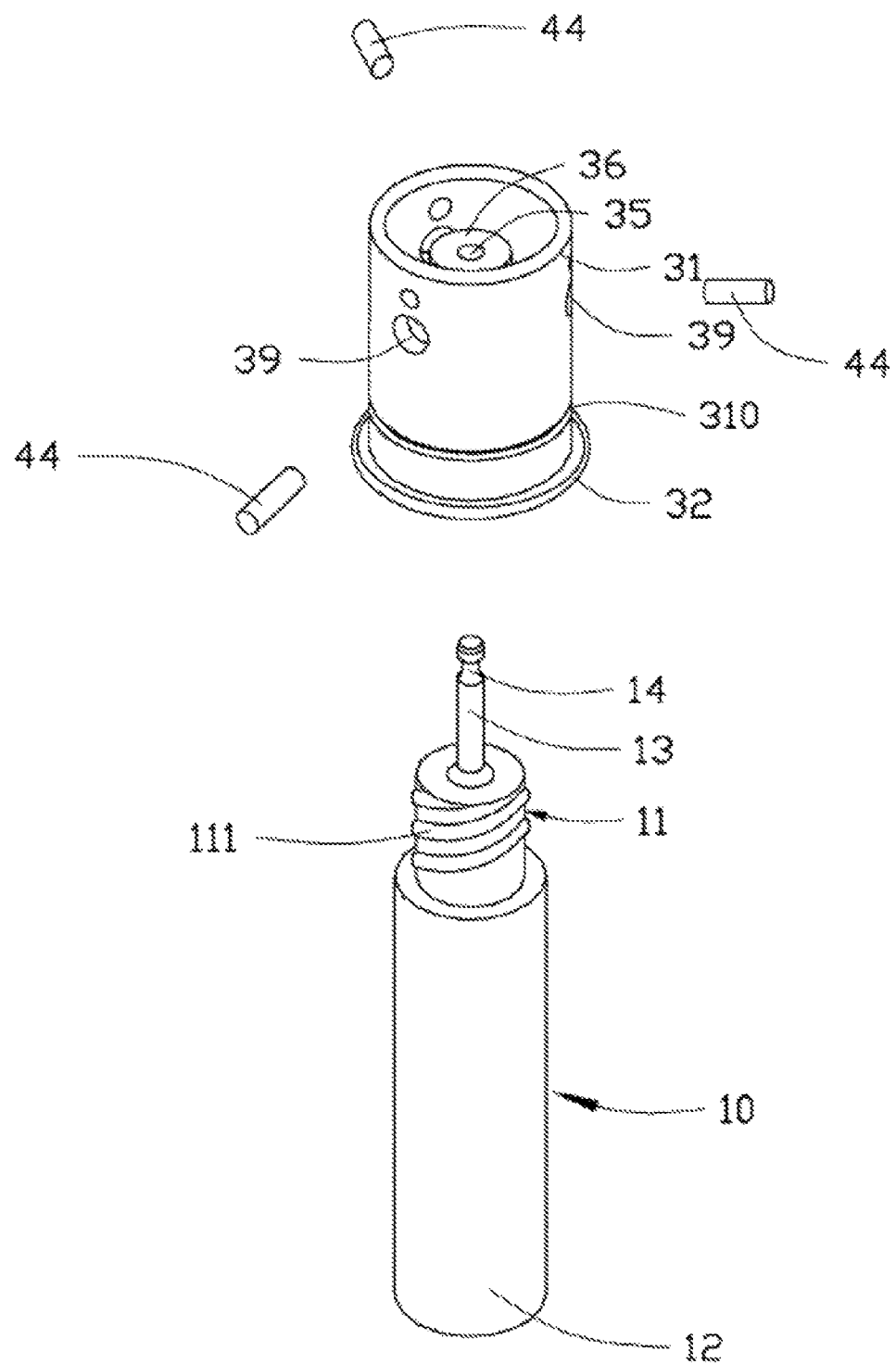
FIG. 4 is a schematic structural diagram of the driving shaft and the mounting base in FIG. 1.

Referring to FIG. 3 and FIG. 4 together, the driving shaft 10 includes a first end portion 11 and a second end portion 12 disposed opposite to each other. The first end portion 11 is used for connecting with the mounting base 30, and the second end portion 12 is used for connecting with the electric motor. The driving shaft 10 further includes a snapping arm 13 that protrudes from the first end portion 11 and extends along an axial direction of the driving shaft 10, and a free end of the snapping arm 13 is provided thereon with a slot 14 that fits in with the snapping part 42. In the implementation mode, the slot 14 is an annular recess formed, at a position on the snapping arm 13 close to the free end, through inward depression from the outer side wall of the snapping arm 13. In other implementation modes, the slot 14 is one or more recesses formed, at a position on the snapping arm 13 close to the free end, through inward depression from the outer side wall of the snapping arm 13.

The mounting base 30 includes a third end portion 31 and a fourth end portion 32 disposed opposite to each other. The fourth end portion 32 of the mounting base 30 is provided thereon with a mounting hole 33. In the implementation mode, the driving shaft 10 and the mounting base 30 are connected through thread fit. Specifically, the first end portion 11 of the driving shaft 10 is provided thereon with an external thread 111, and the mounting hole 33 on the fourth end portion 32 of the mounting base 30 is internally provided with an internal thread 331.

The mounting base 30 further includes a bush part 30. The bush part 36 is internally formed with a hole 35 in communication with the mounting hole 33, and a side wall of the bush part 36 is further provided thereon with a second through hole 38 used for accommodating the snapping part 42. The wall thickness of the bush part 36 is less than the diameter of the snapping part 42. When the first end portion 11 of the driving shaft 10 and the mounting base 30 are connected, the snapping arm 13 passes through the mounting hole 33 and is received in the hole 35.

In the implementation mode, the third end portion 31 of the mounting base 30 is further provided thereon with a first accommodating hole 34. The bush part 36 is formed, in a protruding way, on a bottom surface 37 of the first accommodating hole 34, and the hole 35 is disposed inside the bush part 36 and is in communication with the mounting hole 33. When the first end portion 11 of the driving shaft 10 and the mounting base 30 are connected, the snapping arm 13 passes through the mounting hole 33 and is received in the hole 35. A side wall of the first accommodating hole 34 of the third end portion 31 of the mounting base 30 is further provided thereon with a third through hole 39.

In other implementation modes, the first accommodating hole 34 may also be unnecessary, and the bush part 36 may be formed, in a protruding way, from atop surface of the third end portion 31 of the mounting base 30.

The pressing part 41 of the lock part 40 includes a second accommodating hole 414 and a second recess 415 disposed on an inner side wall 417 of the second accommodating hole 414. In one implementation mode, the second recess 415 is an annular recess formed through inward depression on the inner side wall 417 of the second accommodating hole 414.

In other implementation modes, the second recess 415 is one or more concave holes formed through inward depression on the inner side wall 417 of the second accommodating hole 414. In some embodiments, inward depression on the inner side wall of the second accommodating hole 414 may refer to a depression from the inner side wall 417 into the vertical portion of the pressing part 41, as shown in, e.g., FIG. 3.

In the implementation mode, the pressing part 41 includes a pressing end 411 and an abutting end 412 disposed opposite to each other, and an outer side wall of the pressing part 41 is further provided with a first blocking portion 413 and a sliding slot 416 extending along the axial direction of the driving shaft 10. In the implementation mode, the diameter of the pressing end 411 of the pressing part 41 is greater than the diameter of the abutting end 412, and the first blocking portion 413 is an annular step surface. In other implementation modes, the first blocking portion 413 may be an annular blocking wall protruding on the outer side wall of the pressing part 41.

The abutting end 412 of the pressing part 41 is inserted into the first through hole 23 from the second opening 232 of the first through hole 23 of the blade set 20. The elastic member 43 abuts between the first blocking portion 413 of the pressing part 41 and the mounting base 30. In the implementation mode, the elastic member 43 abuts between the first blocking portion 413 of the pressing part 41 and the bottom surface 37 of the first accommodating hole 34 on the mounting base 30.

In the implementation mode, the snapping part 42 is a ball, the ball may be a steel ball or a ball made of another material. In the implementation mode, the number of the snapping parts 42 is three. In other implementation modes, the number of the snapping parts 42 is one, two, four, or more. The slot 14 on the snapping arm 13 of the driving shaft 10 is a curved recess of which the radius is the same as that of the snapping part 42. The number of the second through holes 38 used for accommodating the snapping part 42 and provided on the side wall of the bush part 36 corresponds to the number of the snapping parts 42.

Figure 5:
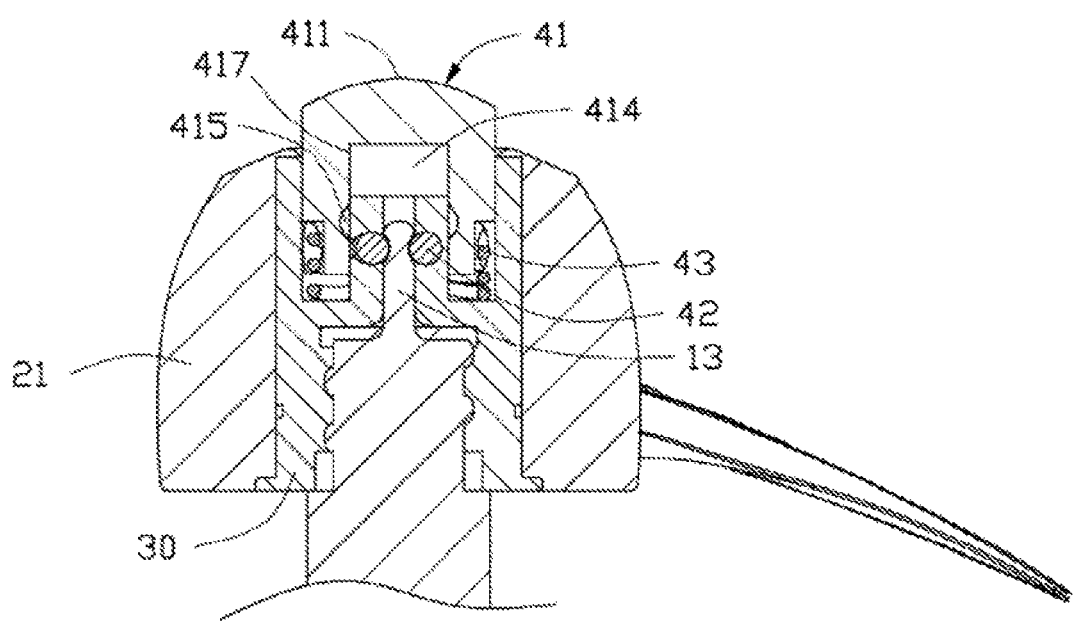
FIG. 5 is a schematic sectional diagram of the propeller in FIG. 1 in a locked state.

In combination with FIG. 3 and FIG. 5, the mounting base 30 is fixed into the first through hole 23, and is fixedly connected with the blade set 20. The pressing part 41 is inserted into the first through hole 23 from the second opening 232 on the blade set 20. The elastic member 43 abuts between the first blocking portion 413 of the pressing part 41 and the mounting base 30, and under the action of the elastic member 43, the pressing end 411 of the pressing part 41 partially extends out of the second opening 232 on the blade set 20. The first end portion 11 of the driving shaft 10 is connected with the mounting hole 33 of the mounting base 30. The snapping arm 13 passes through the mounting hole 33 and is received in the bole 35. The bush part 36 is inserted into the second accommodating hole 414 of the pressing part 41.

In the implementation mode, the lock part 40 further includes a pin 44. One end of the pin 44 passes through the third through hole 39 disposed on a side wall of the first accommodating hole 34 of the third end portion 31 of the mounting base 30 and is slidably accommodated in the sliding slot 416, and the pin 44 is used for limiting a sliding path of the pressing part 41 relative to the mounting base 30. At the same time, the pin 44 is further used for blocking the pressing part 41 from falling out from the first through hole 23.

In one implementation mode, a protruding block is formed, in a protruding way, on the side wall of the first accommodating hole 34 of the third end portion 31 of the mounting base 30, and the protruding block fits in with the sliding slot 416 to limit a sliding trajectory of the pressing part 41. In other implementation modes, it is also feasible to limit the sliding path and the maximum sliding position of the pressing part 41 in the first through hole 23 by disposing a blocking portion on the inner side wall of the first through hole 23 or in another manner.

As shown in FIG. 5, the lock part 40 is in a locked state. The second recess 415 of the pressing part 41 is staggered from the second through hole 38 of the bush part 36. The snapping part 42 is accommodated in the second through hole 38 of the bush part 36. One end of the snapping part 42 is snapped into the slot 14 of the snapping arm 13 of the driving shaft 10, and the other end abuts against the inner side wall 417 of the second accommodating hole 414 of the pressing part 41 to make it impossible for the snapping part 42 to detach from the slot 14, thereby achieving locking of the driving shaft 10.

Figure 6:
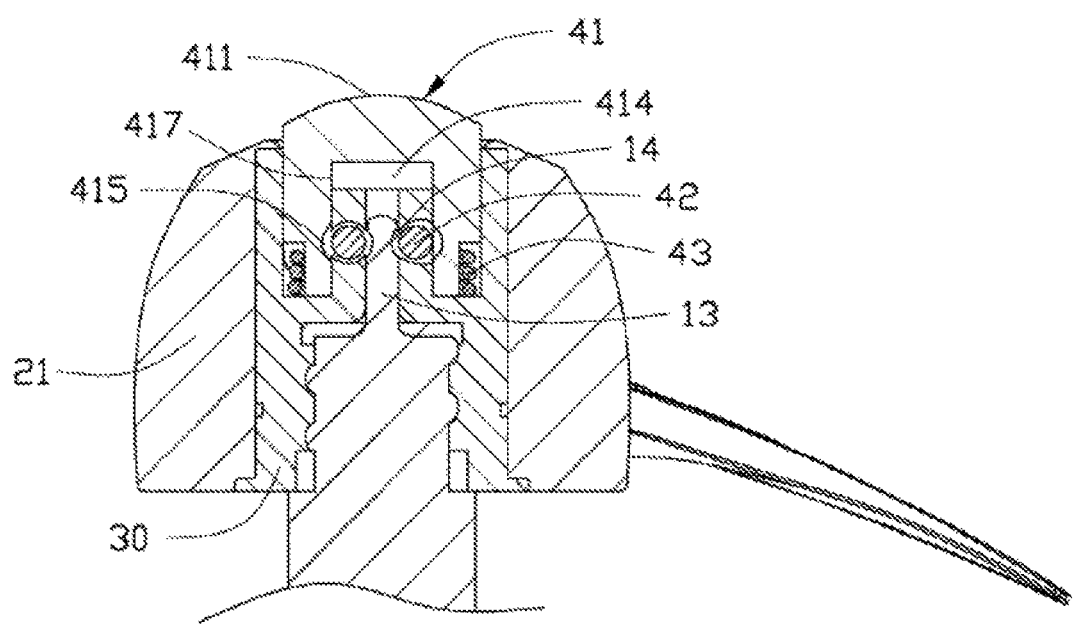
FIG. 6 is a schematic sectional diagram of the propeller in FIG. 1 in an unlocked state.

In combination with FIG. 3 and FIG. 6, the lock part 40 is in an unlocked state. When the pressing part 41 of the lock part 40 is driven by an external force to slide to a pre-set position along the first through hole 23 of the blade set 20 towards a direction close to the driving shaft 10, the second recess 415 of the pressing part 41 is communicated with a second through hole 38 on the side wall of the bush part 36. On an inner side of the second accommodating hole 414 of the pressing part 41, the snapping part 42 can be detached from the slot 14, and the elastic member 43 is in a compression state. In the unlocked state, the external force applied to the pressing part 41 is maintained, which can separate the mounting base 30 from the driving shaft 10. For example, in the implementation mode, the driving shaft 10 and the mounting base 30 are connected through thread fit, and the mounting base 30 and the driving shaft 10 can be separated from each other only by rotating the blade set 20 along an unscrewing direction.

In the unlocked state, the external force applied to the pressing part 41 is withdrawn, and the pressing part 41, under the action of the elastic member 43, slides along the first through hole 23 of the blade set 20 towards a direction away from the driving shaft 10 to return to the locked state shown in FIG. 5.

In one implementation mode, the mounting base 30 and the hub 21 may also be integrally formed.

In other implementation modes, the pressing part 41 of the lock part 40 only needs to be slidably disposed on the blade set 20 to make the bush part 36 to be inserted into the second accommodating hole 414 of the pressing part 41. When the pressing part 41 slides to a pre-set position, the second recess 415 on the inner side wall 417 of the second accommodating hole 414 of the pressing part 41 is communicated with the second through hole 38 on the side wall of the bush part 36, and the snapping part 42 accommodated in the second through hole 38 can be detached from the slot 14.

In other implementation manners, the pressing part 41 of the lock part 40 is slidably disposed on the blade set 20. The snapping part 42 may be a telescopic catch pin or protruding block disposed on the pressing part 41, and when the pressing part 41 slides to a pre-set position on the blade set 20, the position of the snapping part 42 corresponds to the position of the slot 14 of the snapping arm 13 of the driving shaft 10 to be snapped into the slot, thereby achieving locking of the driving shaft 10.

In the implementation mode, by disposing the snapping arm 13 having the slot 14 on the driving shaft 10 and disposing the lock part 40, the driving shaft 10 can be locked on the mounting base 30. Even if the propeller 100 vibrates in a large amplitude or the acceleration varies significantly, the driving shaft 10 and the mounting base 30 may not loosen up. Moreover, the propeller 100 in the implementation mode has a structure allowing simple disassembly and having parts that are easy to replace. Persons of ordinary skill in the art should realize that the above implementation modes are merely used to describe the present disclosure, but are not intended to limit the present disclosure, and any proper changes and variations made to the above embodiments within the essential spirit and scope of the present disclosure shall fall within the scope of the present disclosure.

What is claimed is:

1. A lock mechanism comprising:
a snapping part;
a pressing part configured to be slidably connected with a first body, the pressing part comprising:
a pressing end;
a sliding slot extending through a side wall of the pressing part; and
an abutting end opposite to the pressing end, the abutting end being configured to abut against the snapping part to make the snapping part engage with a second body and to lock the second body onto the first body;
a mounting base configured to be connected with the first body, the mounting base comprising:
a bush part having a receiving hole configured to partially receive the second body, a side wall of the bush part including a first through hole accommodating the snapping part, and an outer surface of the side wall of the bush part abutting against an inner surface of a side wall of the abutting end of the pressing part;
a mounting hole arranged at one end of the mounting base and aligned with and in communication with the receiving hole, the mounting hole being internally provided with an internal thread configured to connect the second body in the mounting hole through thread fit;
an accommodating hole arranged at another end of the mounting base surrounding the bush part and configured to accommodate at least a portion of the pressing part; and
a second through hole formed in a side wall of the accommodating hole; and
a pin configured to slide in the sliding slot and limit movement of the pressing part relative to the mounting base and the first body, the pin passing through the second through hole, one end of the pin being configured to connect with the first body; and another end of the pin being slidably received in the sliding slot of the pressing part.

2. The lock mechanism of claim 1, wherein:
the snapping part is configured to fit in a slot disposed on a free end of a snapping arm on the second body and engage with the slot, to make the second body locked onto the first body, or
the pressing part is configured to separate from the snapping part when the pressing part slides to a pre-set position relative to the first body, causing the snapping part to detach from the second body to allow the second body to separate from the first body.

3. The lock mechanism of claim 1, further comprising:
an elastic member surrounding outside the side wall of the bush part and being configured to abut between the pressing part and the first body,
wherein the snapping part is configured to engage with the second body when the elastic member is in a natural state.

4. The lock mechanism of claim 3, wherein the elastic member is wrapped around and outside the abutting end of the pressing part.

5. The lock mechanism of claim 1, wherein:
the pressing part comprises an accommodating hole disposed on the abutting end, an inner side wall of the accommodating hole including a recess,
when the snapping part engages with the second body, one end of the snapping part is snapped to the second body and another end of the snapping part abuts against the inner side wall of the accommodating hole, and
when the pressing part slides to a pre-set position relative to the first body, the recess is communicated with the through hole, and the snapping part is separated from the inner side wall of the accommodating hole, causing the snapping part to detach from the second body.

6. A propeller comprising:
a blade set including a hub and a blade; and
a lock mechanism comprising:
a snapping part;
a pressing part configured to be slidably connected with the blade set, the pressing part comprising:
a pressing end;
a sliding slot extending through a side wall of the pressing part; and
an abutting end opposite to the pressing end, the abutting end being configured to abut against the snapping part to make the snapping part engage with a driving shaft and to lock the driving shaft onto the blade set;
a mounting base directly fixed in the hub and being configured to be connected with the blade set, the mounting base comprising:
a bush part having a receiving hole configured to partially receive the driving shaft, a side wall of the bush part including a first through hole accommodating the snapping part, and an outer surface of the side wall of the bush part abutting against an inner surface of a side wall of the abutting end of the pressing part; and
a mounting hole arranged at one end of the mounting base and aligned with and in communication with the receiving hole, the mounting hole being internally provided with an internal thread configured to connect the driving shaft in the mounting hole through thread fit;
an accommodating hole arranged at another end of the mounting base surrounding the bush part and configured to accommodate at least a portion of the pressing part; and
a second through hole formed in a side wall of the accommodating hole; and
a pin configured to slide in the sliding slot and limit movement of the pressing part relative to the mounting base and the blade set, the pin passing through the second through hole, one end of the pin being configured to connect with the blade set, and another end of the pin being slidably received in the sliding slot of the pressing part.

7. The propeller of claim 6, wherein:
the snapping part is configured to fit in a slot disposed on a free end of a snapping arm on the driving shaft and engage with the slot, to make the driving shaft locked onto the propeller, or
the abutting end of the pressing part is configured to separate from the snapping part when the pressing part slides to a pre-set position relative to the blade set, causing the snapping part to detach from the driving shaft to allow the driving shaft to separate from the blade set.

8. The propeller of claim 6, wherein:
the pressing part comprises an accommodating hole disposed on the abutting end, an inner side wall of the accommodating hole including a recess,
when the snapping part engages with the driving shaft, one end of the snapping part is snapped to the driving shaft and another end of the snapping part abuts against the inner side wall of the accommodating hole, and
when the pressing part slides to a pre-set position relative to the blade set, the recess is communicated with the through hole, and the snapping part is separated from the inner side wall of the accommodating hole, causing the snapping part to detach from the driving shaft.

9. The propeller of claim 8, wherein:
the blade set includes a third through hole, and
the mounting base is fixed in the third through hole, and the pressing part is slidably disposed in the third through hole.

10. The propeller of claim 6, wherein:
the lock mechanism further comprises an elastic member surrounding outside the side wall of the bush part and being configured to abut between the pressing part and the blade set, and
the snapping part is configured to engage with the driving shaft when the elastic member is in a natural state.

11. The propeller of claim 6, wherein the mounting base further includes a recess formed around an outer side wall of the mounting base, the recess being filled with plastic.

12. An aerial vehicle, comprising:
an aerial vehicle body;
a motor disposed on the aerial vehicle body and comprising a driving shaft; and
a propeller connected with the driving shaft, the propeller comprising:
a blade set including a hub and a blade; and
a lock mechanism comprising:
a snapping part;
a pressing part configured to be slidably connected with the blade set, the pressing part comprising:
a pressing end;
a sliding slot extending through a side wall of the pressing part; and
an abutting end opposite to the pressing end, the abutting end being configured to abut against the snapping part to make the snapping part engage with the driving shaft and to lock the driving shaft onto the blade set;
a mounting base directly fixed in the hub and being configured to be connected with the blade set, the mounting base comprising:
a bush part having a receiving hole configured to partially receive the driving shaft, a side wall of the bush part including a first through hole accommodating the snapping part, and an outer surface of the side wall of the bush part abutting against an inner surface of a side wall of the abutting end of the pressing part;
a mounting hole arranged at one end of the mounting base and aligned with and in communication with the receiving hole, the mounting hole being internally provided with an internal thread configured to connect the driving shaft in the mounting hole through thread fit;
an accommodating hole arranged at another end of the mounting base surrounding the bush part and configured to accommodate at least a portion of the pressing part; and
a second through hole formed in a side wall of the accommodating hole; and
a pin configured to slide in the sliding slot and limit movement of the pressing part relative to the mounting base and the blade set, the pin passing through the second through hole, one end of the pin being configured to connect with the blade set, and another end of the pin being slidably received in the sliding slot of the pressing part.

13. The aerial vehicle of claim 12, wherein:
the snapping part is configured to fit in a slot disposed on a free end of a snapping arm on the driving shaft and engage with the slot, to make the driving shaft locked onto the propeller, or
the abutting end of the pressing part is configured to separate from the snapping part when the pressing part slides to a pre-set position relative to the blade set, causing the snapping part to detach from the driving shaft to allow the driving shaft to separate from the blade set.

14. The aerial vehicle of claim 13, wherein the slot includes a recess formed through depression from an outer side surface of the free end of the snapping arm.

15. The aerial vehicle of claim 12, wherein:
the pressing part comprises an accommodating hole disposed on the abutting end, an inner side wall of the accommodating hole including a recess,
when the snapping part engages with the driving shaft, one end of the snapping part is snapped to the driving shaft and another end of the snapping part abuts against the inner side wall of the accommodating hole, and
when the pressing part slides to a pre-set position relative to the blade set, the recess is communicated with the through hole, and the snapping part is separated from the inner side wall of the accommodating hole, causing the snapping part to detach from the driving shaft.

16. The aerial vehicle of claim 15, wherein:
the blade set includes a third through hole, and
the mounting base is fixed in the third through hole, and the pressing part is slidably disposed in the third through hole.

* * * * *